United States Patent Office 3,435,016
Patented Mar. 25, 1969

3,435,016
CHEMICAL COMPOSITION AND PROCESS OF PREPARATION AND USE
Robert E. Rinehart, Wayne, N.J., assignor to Uniroyal, Inc., a corporation of New Jersey
No Drawing. Filed June 29, 1966, Ser. No. 561,396
Int. Cl. C08f 1/46, 5/00
U.S. Cl. 260—93.1                    15 Claims

ABSTRACT OF THE DISCLOSURE

A complex of a cyclic olefin, including diolefins and an iridium halide is used to polymerize bicyclic diolefins, norbornadiene, norbornene and derivatives thereof. The complex has the general formula $[IrX(R)_y]_2$ where X is a halogen, either chlorine or bromine; R is a cyclic olefin or cyclic diolefin radical, either $C_8H_{12}$ or $C_8H_{14}$ and Y is 1 when R is $C_8H_{12}$ and is 2 when R is $C_8H_{14}$.

---

This invention relates to a new catalyst composition, its use in chemical reactions, particularly polymerization reactions. More specifically, the invention teaches a new composition which is a complex of a cyclic olefin, including diolefins, and an iridium halide. These new compositions have the formula $[IrX(R)_y]_2$, where X is a halogen, either chlorine or bromine; R is a cyclic olefin or cyclic diolefin radical, either $C_8H_{12}$ or $C_8H_{14}$; and y is 1 when R is $C_8H_{12}$ and is 2 when R is $C_8H_{14}$. The compounds of the formula are iridium chloride cyclooctadiene, $[IrClC_8H_{12}]_2$; iridium chloride cyclooctene, $[IrCl(C_8H_{14})_2]_2$; iridium bromide cyclooctadiene, $$[IrBrC_8H_{12}]_2$$

and iridium bromide cyloocetene, $[IrBr(C_8H_{14})_2]_2$.

The complexes of the present invention are the reaction products resulting from the interaction of hydrated iridium trichloride and hydrated iridium tribromide with cyclooctene and 1,5-cyclooctadiene. The complexes can be made by reacting the hydrated iridium halides with the cycloolefin in a mixed solvent system such as an aqueous solution of an alcohol. The preferred solvent system is a mixture of ethyl alcohol and water. The ratio of water to alcohol should be from 1 to 3 to 3 to 1 on a volume basis.

In making the compounds of the present invention, the hydrated iridium halide is dissolved in the solvent system and a sufficient amount of cycloolefin is added to form two phases. One phase consists initially of the solution of iridium salt in the solvent system with a small account of dissolved cycloolefin. The other phase is primarily the cycloolefin. It may be desirable to add a small amount of an inert solvent such as chloroform, diethyl ether, hexane, cyclohexane or benzene to insure the formation of two phases. The concentration of the hydrated iridium halide in the solvent system should be less than 25% by weight. At concentrations greater than 25%, there is a tendency to form the iridium hydrido chloride cycloolefin complex which is not effective as a polymerization catalyst. The ratio of hydrated iridium halide to cycloolefin in the reaction mixture should be from 0.5 to 3 parts by weight of cycloolefin per part by weight of iridium halide. The preferred range is from 1 to 2 parts by weight cycloolefin per part by weight of hydrated iridium halide.

The reaction mixture is then heated to a temperature in the range of 25 to 75° C. with gentle agitation. The reaction proceeds relatively slowly and a reaction time of from 24 to 48 hours is preferred. The reaction may be allowed to continue for up to 240 hours. The product is recovered by cooling the reaction vessel and separating the solid product from the solvent system. The product may be purified by washing with a lower molecular weight alcohol such as methanol.

The complexes of the present invention have been found to be useful as polymerization catalysts. They have been found to be effective catalysts for the polymerization of bicyclic diolefins and olefins such as norbornadiene; norbornene and its derivatives such as 5-carbomethoxy-norbornene, 5-phenyl-2-norborene, 2-norbornene-5-carboxylic acid, 2-hydroxymethyl-5-norbornene, exo-dicyclopentadiene, endo-dicyclopentadiene, 5-methyl-5-carbomethoxy-2-norbornene, trans-dimethyl bicyclo[2,2,1]-hept-5-ene-2,3 - dicarboxylate, exo-dihydrodicyclopentadiene, trans-5,6-dichlorobicyclo[2,2,1]-hept-2-ene, and endo-cis-5,6-dichlorobicyclo[2,2,1]-hept-2-ene; and cyclic dienes such as 1,3-cyclohexadiene. The complexes are effective catalysts in bulk, solution and emulsion polymerization systems.

When using the present complexes as catalysts in a solution polymerization system, the solvent employed should be an inert solvent in which both the iridium halide complex and the monomer are soluble. Appropriate solvents include halocarbons, such as methylene chloride and chloroform; alcohols, such as ethanol and butanol; and aromatic hydrocarbons such as benzene and toluene. When using the present complexes as catalysts in an emulsion polymerization system, the emulsifier employed may be a nonionic or anionic emulsifier such as those commonly used in the emulsion polymerization of diene rubbers.

The iridium complexes of the present invention have been found to be effective catalysts for the monomers previously described. The present complexes are more effective catalysts in terms of rate of reaction than catalysts such as iridium salts which have previously been employed as catalysts in the polymerization of this type of monomer. Polymerization rates up to 9,000 grams per hour per gram of catalysts have been achieved using the present complex.

The present catalyst is also more versatile in that it can be used in bulk, solution and emulsion polymerization systems and is used without a reducing agent as a catalyst activator necessary when using the iridum salts as catalysts.

In employing the present complexes as polymerization catalysts, the polymerization may be performed at a temperature of from 0 to 100° C., with a preferred temperature range of from 20 to 50° C.

The amount of catalysts employed in the polymerization reaction is not critical as it will be realized by those skilled in the art that the rate of reaction is directly dependent on the amount of catalyst present. Amounts of the iridium halide complex as low as 1 part by weight per 10,000 parts by weight of monomer have been successfully employed to obtain polymers. There is no particular advantage in using more catalyst than will dissolve in the solvent. This amount is on the order of 1 part by weight of catalyst per 10 parts by weight of monomer.

The polymerization time is again not critical and is largely a matter of choice based on the reactivity of the catalyst for the specific monomer. Polymerization times from about 0.01 hours to 120 hours have been employed.

The amount of solvent employed in the solution polymerization system is not critical. The iridium halide complexes will function with no solvent, a bulk system, as well as with a solvent. The particular amount of solvent employed will depend on such factors as obtaining a reaction product within a desired viscosity range as would permit sufficient agitation using conventional equipment.

When using the iridium halide complex to obtain the polymer as a latex, the amount of emulsifier employed is usually from 1 to 10 percent of emulsifier based on the weight of the water in the system, with a preferred range of about 2.5 to 5 percent on the same basis.

In order to more fully describe the instant invention, the following examples are set forth. In the following examples. Examples 1–6 show the preparation of the iridium halide cycloolefin complex of the present invention. Examples 7–13 show the use of complex as a polymerization catalyst.

The following abbreviations are used in the examples: g., grams; ml., milliliters; EtOH, ethyl alcohol; Abs EtOH, Absolute ethyl alcohol; soln., solution. Nacconal NRSF is a sodium alkyl benzene sulfonate emulsifier. Pluronic F-68 is a monionic emulsifier, a copolymer of ethylene oxide and propylene oxide. The specific gravity of 1,5-cyclooctadiene is 0.881 and the specific gravity of cyclooctene is 0.849.

EXAMPLE 1

The following recipes, sealed in glass tubes, were slowly agitated on a thermostated bath held at 50°, for 90 hours. The tubes were cooled to room temperature and opened. Each tube contained a solid, which was removed by filtration, and washed with a small amount of methanol. The filtrate consisted of two liquid phases. The smaller, reddish phase was separated, and to it was added methanol. The solid which precipitated was then isolated by filtration.

|  | A | B | C | D | E | F |
|---|---|---|---|---|---|---|
| $IrCl_3 \cdot 4H_2O$, g | 2 | 2 | 2 | 2 | 2 | 2 |
| $H_2O$, ml | 12.5 | 12.5 | 12.5 | 12.5 | 12.5 | 12.5 |
| EtOH, ml | 7.5 | 7.5 | 7.5 | 7.5 | 7.5 | 7.5 |
| 1,5-cyclooctadiene, ml | 2.0 | 2.0 | 3.0 | 3.0 | 3.0 | 3.0 |
| Chloroform, ml | | 0.5 | | 0.5 | 1.0 | 5.0 |
| Yield, solid, g | 0.979 | 0.919 | 0.878 | 0.723 | 0.561 | |
| M.P | | 188–195 | 198–202 | | 199–202 | |
| Yield, solid pptd. from liquid in filtrate, g | 0.031 | 0.052 | 0.040 | 0.064 | 0.178 | 0.069 |
| M.P | | | | | | 184–188 |

Sample E was analyzed, giving the following results:
Ananlysis calculated for $(IrClC_8H_{12})_2$; C, 28.61; H, 3.60; Cl, 10.56. Mol. wt. 672. Found: C, 28.79; H, 3.56; Cl. 10.21. Mol. wt. 589.

EXAMPLE 2

The following were prepared as in Example 1, with the exception that the reaction time was 68 hours:

|  | A | B | C |
|---|---|---|---|
| $IrCl_3 \cdot 4H_2O$, g | 2 | 2 | 2 |
| $H_2O$, ml | 15 | 15 | 15 |
| Abs EtOH | 5 | 5 | 5 |
| 1,5-cyclooctadiene, ml | 1.5 | 2.0 | 3.0 |
| Yield of solid, g | 0.83 | 0.79 | 0.60 |
| M.P | 198–201 | 197–202 | 198–203 |

EXAMPLE 3

The following examples were prepared as in Example 2, with the exception that A and E were reacted for 41 hours, and that B, C, and D were reacted for 113 hours. This example shows the importance of maintaining a good ratio among reactants, as E produced, instead of $(IrClC_8H_{12})_2$, the insoluble complex $(IrHCl_2C_8H_{12})_2$.

|  | A | B | C | D | E |
|---|---|---|---|---|---|
| $IrCl_3 \cdot 4H_2O$, g | 1.0 | 1.0 | 1.0 | 1.0 | 1.0 |
| Abs EtOH, ml | 15 | 15 | 15 | 15 | 3 |
| $H_2O$, ml | 5 | 5 | 5 | 5 | 1 |
| 1,5-cyclooctadiene, ml | 1.8 | 2.2 | 2.6 | 3.0 | 2.0 |
| Yield, g | .082 | .042 | .057 | .0016 | 0.373 |

Analysis.—E: C, 26.08; H, 3.71; Cl. 18.24.

EXAMPLE 4

This sample was prepared as in Example 1, with the exception that the reaction time was 66 hours.

| | |
|---|---|
| $IrCl_3 \cdot 4H_2O$ ----g-- | 1.0 |
| $H_2O$ ----ml-- | 10 |
| EtOH ----ml-- | 20 |
| 1,5-cyclooctadiene ----ml-- | 2 |
| Yield, g. of solid | 0.26 |

EXAMPLE 5

This example shows typical conditions for formation of the iridium chloride-cyclooctene complex as listed in the following table.

PREPARATION OF IRIDIUM CHLORIDE-CYCLOOCTENE COMPLEX AT 50° C.

| | | | | | | | | |
|---|---|---|---|---|---|---|---|---|
| $IrCl_3 \cdot 4H_2O$, g | 1 | 1 | 1 | 1 | 1 | 1 | 1 | 1 |
| Abs EtOH, ml | 7.5 | 7.5 | 20 | 5 | 7.5 | 10 | 7.5 | 7.5 |
| $H_2O$, ml | 12.5 | 12.5 | 0 | 15 | 12.5 | 10 | 12.5 | 12.5 |
| Cyclooctene, ml | 2 | 2 | 2 | 2 | 2 | 2 | 2 | 2 |
| Reaction time, days | 6 | 4 | 4 | 3 | 3 | 3 | 3 | 3 |
| Yield, g | 1.488 | 1.36 | 0.00 | 0.12 | 0.22 | 0.43 | 0.33 | 0.19 |

EXAMPLE 6

This example shows the preparation of the iridium bromide complex of the present invention. The reaction temperature was 50° C.

|  | A | B |
|---|---|---|
| $IrBr_3 \cdot 4H_2O$, g | 1 | 1 |
| Abs EtOH, ml | 5 | 5 |
| $H_2O$, ml | 5 | 5 |
| Cyclooctene, ml | 1 | |
| 1,5-cyclooctadiene, ml.: | | 1 |
| Reaction time, hrs | 162 | 162 |
| Yield, g | 0.435 | 0.332 |

EXAMPLE 7

This example shows the polymerization of norbornene by iridium chloride cyclooctene in solution and bulk (E).

|  | A | B | C | D | E | F | G | H |
|---|---|---|---|---|---|---|---|---|
| Complex, g | .005 | .005 | .005 | .005 | .005 | .005 | .005 | .025 |
| Norbornene, g | 5 | 5 | 10 | 10 | 10 | 50 | 50 | 100 |
| Solvent | $C_6H_6$ | $C_6H_6$ | $C_6H_6$ | EtOH | None | $C_6H_6$ | $C_6H_6$ | $C_6H_6$ |
| Total soln., ml | 20 | 20 | 200 | 200 | | 20 | 200 | 300 |
| Time, min | 3.0 | 1.0 | 1.0 | 1.0 | 1.0 | 90 | 996 | 3 days |
| Temp., °C | 25 | 25 | 76 | 76 | 96 | 50 | 50 | 50 |
| Yield, g | 0.814 | 0.063 | 0.166 | 0.024 | 0.747 | 3.88 | 6.13 | 75.7 |
| Conversion, g./hr.-g. cat | 3,255 | 757 | 1,990 | 288 | 8,965 | 518 | 69 | 46 |

EXAMPLE 8

This example shows the emulsion polymerization of norbornene by iridium chloride cyclooctene complex at 50° C.

|  | A | B | C | D |
|---|---|---|---|---|
| Complex, g | .01 | 0.01 | 0.01 | 0.002 |
| Pluronic F-68, g | 0.5 |  |  |  |
| Nacconal NRSF, g |  | 0.5 | 5 | 5 |
| H₂O, ml | 20 | 20 | 200 | 200 |
| Norbornene, g | 10 | 10 | 100 | 100 |
| Reaction time, hrs | 2 | 2 | 15.8 | 69.5 |
| Polymer yield, g | 7.77 | 8.19 | 19.22 | 3.01 |
| Yield, g./g. cat | 777 | 819 | 1,922 | 1,505 |
| Conv./g.-hr./g. cat | 388.5 | 409.5 | 121 | 22 |

EXAMPLE 9

This example shows the emulsion polymerization of norbornene by complexes of iridium bromide at 50°.

|  | A | B |
|---|---|---|
| IrBr cyclooctene, g | 0.05 |  |
| IrBr 1,5-cyclooctadiene, g |  | 0.05 |
| Nacconol NRSF, g | 0.05 | 0.05 |
| H₂O, ml | 20 | 20 |
| Norbornene, g | 10 | 10 |
| Time, hrs | 3 | 3 |
| Yield, g | 5.41 | 0.77 |
| Conv. g./hr.-g. cat | 36.1 | 5.1 |

EXAMPLE 10

This example shows the polymerization of norbornene by $(IrCl C_8H_{12})_2$ under various conditions.

|  | A | B | C | D | E |
|---|---|---|---|---|---|
| (IrClC₈H₁₂)₂, g | 0.05 | 0.05 | 0.05 | 0.005 | 0.005 |
| EtOH, ml | 10 |  |  |  |  |
| H₂O, ml |  | 10 | 10 |  |  |
| Pluronic F-68, g (emulsifier) |  | 0.5 | 0.5 |  |  |
| SnCl₂·2H₂O |  |  | 0.1 |  |  |
| CHCl₃, ml |  |  |  | 15 | 15 |
| Norbornene, g | 3 | 3 | 3 | 5 | 5 |
| Polymerization temp., °C | 50 | 50 | 50 | 24 | 24 |
| Polymerization time, hrs | 65 | 65 | 65 | 10 min. | 1.0 |
| Polymer yield, g | 2.11 | 1.52 | 2.25 | 0.0006 | 0.0293 |

|  | F | G | H | I | J |
|---|---|---|---|---|---|
| (IrClC₈H₁₂)₂, g | 0.05 | 0.05 | 0.05 | 0.05 | 0.05 |
| EtOH, ml |  |  |  |  | 10 |
| H₂O, ml | 20 | 20 |  |  |  |
| Sodium alkyl benzene sulfonate | 0.5 | 0.5 |  |  |  |
| Ether |  |  | 20 |  |  |
| Norbornene, g | 5 | 5 | 5 | 10 | 5 |
| Polymerization temp., °C | 50 | 50 | 50 | 50 | 50 |
| Polymerization time, hrs | 18 | 18 | 18 | 17 | 18 |
| Polymer yield, g | 0.858 | 0.812 | 0.548 | 8.3 | 3.17 |

EXAMPLE 11

This example shows the polymerization of a ring-substituted norbornene, 5-carbomethoxy norbornene.

|  | A | B |
|---|---|---|
| (IrClC₈H₁₂)₂, g | 0.05 | 0.05 |
| EtOH, ml |  | 2.5 |
| H₂O, ml | 10 | 10 |
| Pluronic F-68 emulsifier, g | 0.25 | 0.25 |
| 5-carbomethoxynorbornene, ml | 1.8 | 1.8 |
| Reaction time, hrs | 65 | 65 |
| Reaction temperature, °C | 50 | 50 |
| Polymer yield, g | 0.835 | 1.09 |

EXAMPLE 12

This example shows the polymerization of norbornadiene to a polymer which gives a crystalline X-ray diffraction pattern.

|  | A | B | C |
|---|---|---|---|
| (IrClC₈H₁₂)₂, g | 0.05 | 0.05 | 0.05 |
| EtOH, ml | 20 | 20 | 20 |
| Norbornadiene, ml | 5 | 5 |  |
| Temperature, °C | 50 | 50 | 5 |
| Reaction time, hrs | 18 | 90 | 50 |
| Polymer yield, g | 0.051 | 0.136 | 18 |
|  |  |  | 0.209 |

EXAMPLE 13

This example shows the polymerization of 1,3-cyclohexadiene to a polymer with properties and an infrared spectrum similar to polycyclohexadiene described by C. S. Marvel and G. E. Hartzell, J. Am. Chem. Soc. 81, 449 (1959).

|  | A |
|---|---|
| (IrClC₈H₁₂)₂, g | 0.05 |
| EtOH, ml | 20 |
| 1,3-cyclohexadiene, ml | 5 |
| Reaction temperature, °C | 50 |
| Reaction time, hrs | 114 |
| Polymer yield, g | 0.029 |

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition of matter having the formula $[IrX(R)_y]_2$ where X is a halogen selected from the group consisting of chlorine and bromine, R is a cyclic olefin radical selected from the group consisting of $C_8H_{12}$ and $C_8H_{14}$ and y is 1 when R is $C_8H_{12}$ and 2 when R is $C_8H_{14}$.

2. The composition of claim 1 in which X is chlorine, R is $C_8H_{12}$ and y is 1.

3. The composition of claim 1 in which X is chlorine, R is $C_8H_{14}$ and y is 2.

4. The composition of claim 1 in which X is bromine, R is $C_8H_{12}$ and y is 1.

5. The composition of claim 1 in which X is bromine, R is $C_8H_{14}$ and y is 2.

6. A process of preparing a cycloolefin iridium halide complex comprising reacting a hydrated iridium halide selected from the group consisting of iridium trichloride and iridium tribromide with a cyclic olefin selected from the group consisting of 1,5-cyclooctadiene and cyclooctene in an aqueous solution of ethanol, said iridium halide being present in said solution at a concentration of less than 25% by weight.

7. The process of claim 6 in which the iridium halide is iridium trichloride and the cycloolefin is cyclooctene.

8. The process of claim 6 in which the iridium halide is iridium trichloride and the cycloolefin is 1,5-cyclooctadiene.

9. The process of claim 6 in which the iridium halide is iridium tribromide and the cycloolefin is cyclooctene.

10. The process of claim 6 in which the iridium halide is iridium tribromide and the cycloolefin is 1,5-cyclooctadiene.

11. A process for polymerizing an olefin monomer selected from the group consisting of bicyclic diolefins, bicyclic olefins, substituted bicyclic olefins and cyclic dienes which comprises contacting said monomer with a catalyst, said catalyst having the formula $(IrX(R)_y)_2$ where X is a halogen selected from the group consisting of chlorine and bromine, R is a cyclic olefin radical selected from the group consisting of $C_8H_{12}$ and $C_8H_{14}$ and y is 1 when R is $C_8H_{12}$ and y is 2 when R is $C_8H_{14}$.

12. The process of claim 11 in which the olefin monomer is norbornene.

13. The process of claim 11 in which the olefin monomer is norbornadiene.

14. The process of claim 11 in which the olefin monomer is 5-carbomethoxy norbornene.

15. The process of claim 11 in which the olefin monomer is 1,3-cyclohexadiene.

References Cited
UNITED STATES PATENTS 3,336,275  8/1967  Michelotti _____ 260—93.1
3,367,924  2/1968  Rinehart _____ 260—93.1

JOSEPH L. SCHOFER, *Primary Examiner.*

L. EDELMAN, *Assistant Examiner.*

U.S. Cl. X.R.

252—441